UNITED STATES PATENT OFFICE 2,590,968

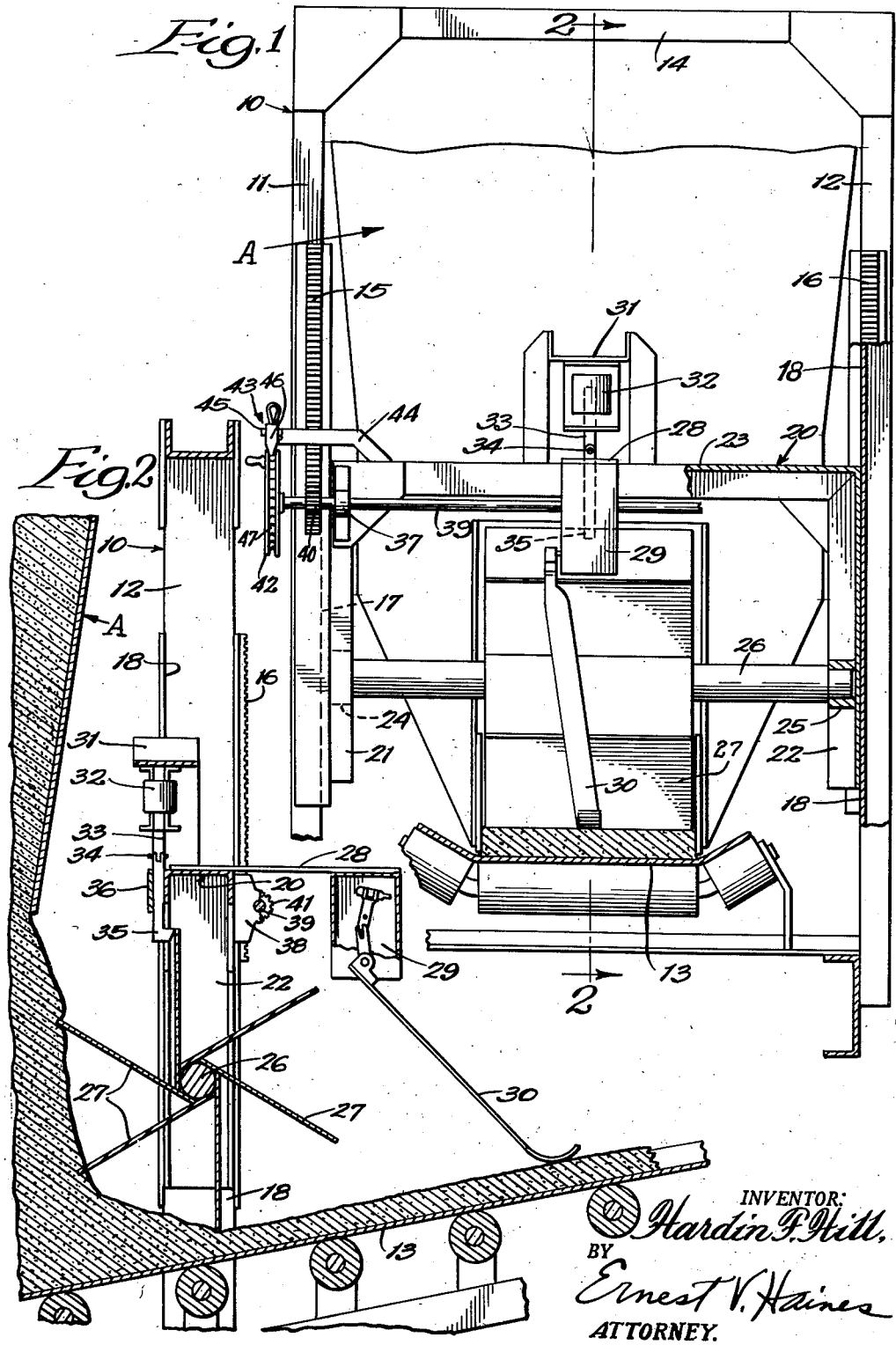

FEEDER FOR SOLID MATERIALS

Hardin F. Hill, Columbia, Tenn., assignor to International Minerals & Chemical Corporation, a corporation of New York Application October 17, 1950, Serial No. 190,586

8 Claims. (Cl. 198—54)

This invention relates to new and novel apparatus for control of the delivery of wet or moist solid materials from accumulators or storage hoppers. More particularly, it relates to apparatus for the feeding of wet rock such as wet phosphate rock, whether previously comminuted or not, to a belt conveyor, or its equivalent. The invention pertains still more particularly to a depth-regulating gate which is automatic in its adjustment whenever the thickness of the layer of material delivered on a conveyor belt becomes less than the predetermined thickness the gate is adjusted to deliver.

Various types of feeders are in operation which deliver uniform quantities of dry, granular, or powdered products. Where the dry material tends to bridge at the hopper throat, or feed unevenly for any number of reasons, feeders have been equipped with hammers, agitators such as rotating spike wheels positioned in the feeder hopper, and equivalent devices designed to keep the material in a free-flowing condition.

The feeding of the material such as so-called wet phosphate presents an entirely different problem because wet material is not free flowing and often contains relatively large lumps. Feeders of dry material have failed so completely for the purpose that wet materials generally are handled by extruders, helical screws, or similar delivery devices. Extruders, helical screws, and the like, all have their shortcomings. For example, these devices operate well for a uniform particle size feed, but give irregular performance where the particle size varies from large lumps to fine material which would pass through, for example, a 100 mesh standard screen. These devices are particularly subject to jamming due to lumpy feeds such as are prevalent with wet clay and rock feeds encountered during freezing weather.

It is an object of the present invention to provide feeder apparatus for wet rock, coal, and the like, which overcomes the disadvantages and limitations of such feeders utilized heretofore.

It is a further object of the invention to provide feeder apparatus for wet solid materials which is of simplified design and has low maintenance cost.

It is a further object of the invention to provide apparatus which is inexpensive to operate.

It is still another object to provide apparatus which will handle nonuniform particle size feeds.

Still a further object of the invention is to provide apparatus which will automatically discharge material interfering with the flow of wet solid material at a time when the conveyor is operating at a capacity which will permit the conveyor to accept the load backed up behind the regulating gate.

It is still another object of the invention to provide apparatus wherein the regulating gate is rotatable by predetermined increments whereby the depth of the gate is altered to discharge material retained behind the gate when in normal position.

Still another object is to provide apparatus wherein the regulating gate is automatically controlled in its rotation for movement only at times when the conveyor is operating at less than a predetermined capacity.

These and other objects will be apparent to those skilled in the art from the detailed description provided hereinafter.

Briefly, the apparatus comprises a hopper preferably having an outlet at or adjacent the bottom thereof. This hopper feeds wet rock or other nonuniform solid material to a conveyor belt positioned adjacent the hopper outlet. Also positioned adjacent the outlet of the hopper, is a multiple arm or gate unit, each blade of which is adapted, when extending downwardly in vertical position, to act as a gate and to govern the depth of the material on the conveyor. This multiple gate unit is adapted for rotational movement and has its movement governed by means permitting turning only a predetermined number of degrees at each time of movement. The multiple gate unit is rendered free to turn by means responsive to a drop in the height of material carried on the conveyor.

The hopper may be of any design, such as square, pyramidal, or conical, as where the wet rock is being delivered from a constricted bottom of a feeder bin. The degree of constriction is generally governed by the flow characteristics of the wet rock feed and the width of the conveyor belt. In general, the outlet on the hopper is adapted to be of a lesser width than the conveyor belt in order to prevent overloading of the belt and loss of material over the sides thereof during movement to a processing station, such as a drier. Naturally, for any set size of outlet, the poorer the flowing characteristics of the wet rock feed, the steeper the angle of inclination between the bin and the hopper outlet.

The conveyor belt may be of any conventional design. A trough belt is preferred because that design does not require side boards to prevent loss of material from the belt.

Support of the gate in proper adjustable position relative to the hopper outlet and to the conveyor belt requires a framework and a member slidable thereon. The framework is generally in the form of an inverted U-shaped bridge spanning the belt having two vertical members connected at the top by a cross beam and having the bottom of the vertical legs secured to the frame support for the conveyor belt.

The member slidable on the framework may be adapted to circumscribe a portion of the vertical members, as for example by having fingers on the slidable member which enclose a flange of an I beam. The slidable member, on the other hand, may have the ends thereof received in channels or guides along the opposed inner faces of the vertical members. If the vertical members are solid, the inner face may be machined to have a grooved surface of semicircular, U-shaped, or other desirable configuration. Channels or guides may also be provided by the simple expedient of bolting to the front or back surfaces of the vertical members, plates adapted to extend inwardly beyond the inner opposed surfaces of the vertical members.

This slidable member is the moving support whereby a gate is positioned relative to the conveyor belt. The slidable member may be of any configuration which will not interfere with the free rotation of the gate. In its simplest form the gate consists of two legs adapted to slide in guides and connected by a cross bar. The slidable support member may have the cross bar and legs formed as an integral unit, or as separate units joined together, such as by welding, bolts, or the like. The simple form of support member carries on the legs thereof, a pair of axially aligned bearings. These bearings support a shaft freely rotatable therein and on which is secured the gate member consisting of a number of spaced plates.

Any number of plates may be positioned on the shaft providing the rotation arresting means is coordinated therewith to stop the plates in a downward position, preferably vertical, where the plate will act as a control gate. The number of plates is preferably six, with the plates being spaced 60 degrees apart.

The movable support may be actuated by a suitable elevating means in the form of a pulley, a rack and gear mechanism, or the like. In the preferred form of rack and gear mechanism, the straight racks are attached to the framework by suitable means such as welding, bolts, and the like. The cooperating gears are mounted on a shaft rotatably supported on the slidable member. Rotation of the shaft and attached gears, which mesh with the teeth on the racks, will cause the moving support to raise or lower as the direction of gear rotation dictates.

While the multiple blades which act as control gates are mounted on a freely rotatable shaft, the blades are controlled in their movement by suitable means permitting the rotation through only a predetermined number of degrees of a circle at any one period of movement. The control means may take the form of a brake mounted on the rotatable shaft, a ratchet mechanism, a blade stop, or mechanism of equivalent character.

Each of these control means may be actuated by suitable trippping devices such as gears, electrical motors, solenoids, and the like, and combinations thereof. These tripping devices are generally arranged so as to be responsive to lever means which drag or ride on top of the material deposited on the conveyor by the hopper and controlled as to height by the gate. The device will be more fully understood from the following description of the preferred embodiment of the invention which is given by way of illustration and without intention of being limited thereto.

In the drawings, Figure 1 is a front elevational view.

Figure 2 is a sectional view along the line 2—2 of Figure 1.

In these drawings the numeral 10 represents a framework consisting of two vertical members 11 and 12 joined at one end to the frame support of a conveyor belt 13, said framework being positioned adjacent the outlet of a wet rock hopper A. At the other end members 11 and 12 are joined by a rigid cross bar 14. On the face of vertical members 11 and 12 are racks of gear teeth 15 and 16. The inner opposed faces of vertical members 11 and 12 are grooved as at 17 and 18, respectively.

Riding in grooves 17 and 18 is a slidable support 20. Support 20 consists of two vertical arms 21 and 22 joined by a cross bar 23. Secured to arms 21 and 22 are the bearings 24 and 25, respectively. Mounted in bearings 24 and 25 is a shaft 26. Shaft 26 has six plates 27 welded or otherwise affixed thereto. Extending laterally from the cross bar 23 is an arm 28. Arm 28 has suspended therefrom a tilting switch 29. Tilting switch 29, which is preferably a mercoid switch, is actuated by a trigger or drag arm 30 whose free end is adapted to contact the surface of the material supported on the conveyor belt 13.

Cross bar 23 also supports an L-shaped arm 31. Arm 31 has suspended therefrom a solenoid 32 which has the electrical input thereto controlled by tilting switch 29. Within solenoid 32 is positioned an armature 33 movable by gravity to an extended position and retracted by energization of the solenoid coil. Directly connected to the armature, as by means of a bolt 34, is a latch 35 which is freely reciprocal in a guide 36 attached to the cross bar 23.

Support 20 carries, adjacent the cross bar 23, a second pair of aligned bearings 37 and 38. Through bearings 37 and 38 extends a shaft 39. Shaft 39 has mounted thereon, adjacent the bearings and in position to contact the racks 15 and 16, respectively, gears 40 and 41. Shaft 39 also carries a handwheel 42 provided with a brake 43 to maintain any predetermined position. Brake 43 consists of an arm 44 attached to cross bar 23 as through a pivot joint and provided at its free end with a ratchet arm or dog 46 secured by suitable means 45 such as a tapered slot, clamp, or the like. Dog 46 is adapted to cooperate with the toothed or notched surface 47 of handwheel 42.

In the operation of the above described equipment, wet rock descends through the hopper of a storage bin to the conveyor belt 13. The belt 13 drags the material away from the hopper. The depth of wet rock is limited by the downwardly extending gate plate 27. When large lumps of material build up behind the gate, free flow of wet rock from the hopper is shut off and the depth of material on belt 13 is reduced. The drag arm 30, whose position is determined by the contact with the rock on the belt, will then be allowed to swing towards the vertical upon reduction of the depth of the material on the belt. The action of swinging toward the vertical tilts the energizing switch 29 for solenoid 32. Upon energizing solenoid 32 the armature is drawn upward and with it the latch 35. Withdrawal of latch 35 frees the gate 27 extending vertically downward, and permits its movement in response to the frictional drag of rock contacting the moving belt 13. With additional material being free to move on the belt, the drag arm 30 is moved away from the vertical. This movement opens the circuit through the tilting switch 29 and de-energizes the solenoid 32. The armature within solenoid 32, moving by gravity, returns the latch 35 to a position arresting the movement of the blades of the rotating gate. By the movement of the gate through an arc of 60 degrees, the blade initially preventing movement of a large lump of rock, is moved out of the way as a gate and the next blade moving in a downward direction is halted by the latch 35 in a downwardly extending position, thus positioning as a gate a blade which will have the same position as had been in effect at the time of movement of the blade previously established in the vertically downward position.

When it is desirable to adjust the depth of the material on the belt, brake 43 is released and the handwheel 42 turned. Turning of handwheel 42 counterclockwise rotates gears 40 and 41 in contact with the gear racks 15 and 16, respectively, to raise the movable member 20. Rotation of the handwheel 42 clockwise acts to lower the movable member 20.

Thus, there is provided an adjustable height gate which will pass lumps and large aggregates of rock only at times when the loading of the belt is such that the belt can handle the additional material which would not pass the gate at any normal load setting. The gate moves to pass the rock by turning through an angle in a direction following the direction of the conveyor belt, thus raising the effective height of the blade. At the same time, another blade is moved into the vertical position and the original gate height re-established.

Although the present invention has been described in relation to the illustrated preferred form, it should be understood that the present invention is not limited to the apparatus described, but includes such modifications and equivalents as are obvious to those versed in the art. Other solid materials in either wet or dry form can be processed after the manner heretofore described such as sand, gravel, crushed rock, crushed ores, crushed coal, and the like.

Having thus fully described and illustrated the character of the invention, what is desired to be secured and claimed by Letters Patent is:

1. An apparatus for delivering material comprising a hopper, an outlet for said hopper, a conveyor positioned adjacent the outlet of said hopper upon which the material is transferred, a multiple arm gate mounted for free rotational movement at the outlet of said hopper, elevating means for said gate to govern the depth of material on said conveyor, means for arresting rotational movement of the gate, and means responsive to the height of material on said conveyor for actuating the means for arresting rotational movement of the gate.

2. An apparatus for delivering wet material comprising a hopper, an outlet for said hopper, a conveyor positioned adjacent the outlet of said hopper upon which the material is transferred, a multiple arm gate mounted for free rotational movement at the outlet of said hopper upon an axis transverse to the direction of the conveyor movement, elevating means for said gate to govern the depth of material on said conveyor, stop means for arresting rotational movement of the gate, and means responsive to the height of material on said conveyor for actuating the stop means governing rotational movement of the gate.

3. An apparatus for delivering wet rock material comprising a hopper, an outlet for said hopper, a conveyor positioned adjacent the outlet of said hopper upon which the material is transferred, a multiple arm gate mounted for free rotational movement at the outlet of said hopper upon an axis transverse to the direction of conveyor movement, elevating means for said gate to govern the depth of material on said conveyor, stop means for arresting rotational movement of said gate, electrically actuated reciprocating means directly connected for movement of said stop means, and lever means responsive to the height of material on said conveyor for shifting the energizing switch for said reciprocating means into conducting and nonconducting positions.

4. An apparatus for delivering wet rock material comprising a hopper, an outlet for said hopper, a conveyor positioned adjacent the outlet of said hopper upon which the material is transferred, a multiple arm gate mounted for free rotational movement at the outlet of said hopper upon an axis transverse to the direction of conveyor movement, elevating means for said gate to govern the depth of material on said conveyor, stop means for arresting rotational movement of said gate, solenoid means directly connected for movement of said stop means, an electrical switch in the solenoid circuit, and lever means responsive to the height of material on said conveyor for shifting the energizing switch for said solenoid means into conducting and nonconducting positions.

5. An apparatus for delivering wet rock material comprising a hopper, an outlet for said hopper, a conveyor positioned adjacent the outlet of said hopper upon which the material is transferred, a multiple arm gate mounted for free rotational movement at the outlet of said hopper, said arms being positioned in pairs about a central shaft and separated by 180 degrees, elevating means for said gate to govern the depth of material on said conveyor, stop means for arresting rotational movement of said gate, solenoid means directly connected for movement of said stop means, an electrical switch in the solenoid circuit and lever means responsive to the height of material on said conveyor for shifting the energizing switch for said solenoid means into conducting and nonconducting positions.

6. An apparatus for delivering wet rock material comprising a hopper, an outlet for said hopper, a conveyor belt positioned adjacent the outlet of said hopper upon which the material is transferred, a framework spanning said conveyor belt adjacent the outlet of said hopper consisting of vertical members and a cross beam, guides in the opposed inner faces of said vertical members, a support member slidably mounted in said guides, a multiple arm gate supported by a shaft rotatably mounted on said support member, elevating means for said support member, means for arresting rotational movement of said multiple arm gate and means responsive to the height of material on said conveyor for actuating the means for arresting rotational movement of the gate.

7. An apparatus for delivering wet rock material comprising a hopper, an outlet for said hopper, a conveyor positioned adjacent the outlet, a framework spanning said conveyor belt adjacent the outlet of said hopper consisting of vertical members and a cross beam, said vertical members each having a rack of gear teeth on a pair of co-planar faces and having the inner opposed faces thereof adapted as recessed guides, a support member consisting of rigidly interconnected vertical arms, the arms of which are slidably received in said guides, spaced aligned bearings secured to said support member, said bearing being attached at a point removed from the end of said support member adjacent the belt, a rotatable shaft mounted in said bearings, gears mounted on said shaft in spaced positions adapted to mesh with the teeth of said racks to raise and lower said support member, manually operable means for rotating said shaft, a second set of aligned bearings, each of said journals being secured to a vertical arm of said support member, a second shaft rotatably mounted in said second set of bearings, and a multiple arm gate mounted on said second shaft.

8. An apparatus for delivering wet rock material comprising a hopper, an outlet for said hopper, a conveyor positioned adjacent the outlet, a framework spanning said conveyor belt adjacent the outlet of said hopper consisting of vertical members and a cross beam, said vertical members each having a rack of gear teeth on a pair of co-planar faces and having the inner opposed faces thereof adapted as recessed guides, a support member consisting of rigidly interconnected vertical arms, the arms of which are slidably receivable in said guides, spaced aligned bearings secured to said support member, said bearing being attached at a point removed from the end of said support member adjacent the belt, a rotatable shaft mounted on said journals, gears mounted on said shaft in spaced positions adapted to mesh with the teeth of said racks to raise and lower said support member, manually operable means for rotating said shaft, a second set of aligned bearings, a second shaft rotatably mounted in said second set of bearings, and six plates mounted on said shaft angularly separated by 60 degrees and each extending in a plane perpendicular to a radius line of said shaft.

HARDIN F. HILL.

REFERENCES CITED

The following references are of record in the file of this patent:

UNITED STATES PATENTS

| Number | Name | Date |
|---|---|---|
| 1,777,670 | Hausman | Oct. 7, 1930 |